United States Patent Office 3,144,487
Patented Aug. 11, 1964

3,144,487
PROCESS OF PRODUCING CAROTENOIDS
Basil Charles Leicester Weedon, London, England, and Muhammad Akhtar, Lyallpure, West Pakistan, assignors to National Research Development Corporation
No Drawing. Filed Nov. 5, 1959, Ser. No. 851,006
Claims priority, application Great Britain Nov. 6, 1958
7 Claims. (Cl. 260—586)

The present invention relates to the synthesis of carotenoid compounds i.e. carotenoids which are known to occur in nature and certain analogues of such carotenoids, which, if they do occur in nature have not yet been observed. Carotenoid compounds have colouring properties which enable them to be used for colouring foodstuffs, animal feeds and cosmetic preparations, those which are known to occur in nature being the most acceptable especially in dietetic application. The invention further relates to the synthesis of acetylenic analogues of carotenoid compounds from which acetylenic analogues the carotenoid compounds are derivable by partial saturation.

The compounds to which the invention relates correspond with the general formulae

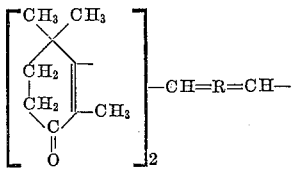

and

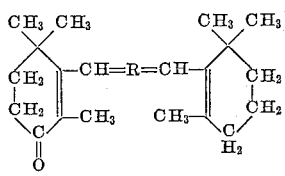

in which the group —CH=R=CH— is the hydrocarbon carotenoid connecting chain group wherein either unsaturation is solely ethylenic or unsaturation is both ethylenic and acetylenic. Thus the group R itself as herein employed is a conjugated unsaturated hydrocarbon carotenoid connecting group which is either solely ethylenically unsaturated or wherein one or more of the ethylenic linkages is replaced by an acetylenic linkage.

For those known to occur in nature R may be regarded as the hydrocarbon residue of such a conjugated polyenic di-aldehyde as 2,6,11,15 - tetramethyl - hexadecaheptaen-(2,4,6,8,10,12,14)-dial-(1,16) [crocetin dialdehyde], 2,6,11,15 - tetramethyl - hexadacahexaen-(2,4,6,10,12,14)-in-(8)-dial-(1,16) [dehydro-crocetin dialdehyde], 2,7-dimethyl-octatrien-(2,4,6)-dial(1,8) or 2,7-dimethyl-octadien-(2,6)-in-(4)-dial-(1,8). Such dialdehydes may be represented by the formula O=R=O.

The synthesis of carotenoid compounds in accordance with the present invention is carried out using as starting material a polyunsaturated ketone of the general formula $(CH_3)_2CH.CO.CH=R=CH.CO.CH(CH_3)_2$ or

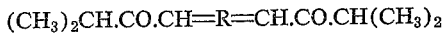
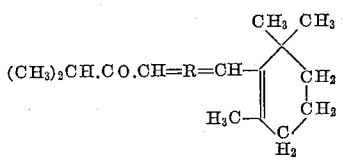

depending upon the product required.

These polyunsaturated starting ketones are obtainable by reacting 3-methylbutan-2-one with a dialdehyde of the formula O=R=O or a monoaldehyde of the formula

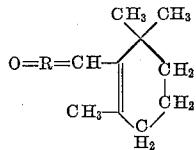

R being as hereinbefore defined, in the presence of an alkaline condensation agent, that is, a caustic alkali or other compound which is to be regarded as alkaline in preparative chemistry even though it is not necessarily an alkali in the classical sense. Examples of applicable alkaline condensation agents are the alkali metal ethoxides and aluminum tert-butoxides. With alkali metal hydroxides and alkoxides the reaction occurs readily without the application of heat, the splitting out of water, which may be presumed to follow the formation of an aldol, taking place spontaneously.

The process for the preparation of a carotenoid compound, according to the invention, in which the hydrocarbon carotenoid connecting group is a hydrocarbon radical selected from the group consisting of conjugated polyethylenic hydrocarbon carotenoid connecting groups and acetylenic analogues thereof, comprises condensing the above polyunsaturated ketone which may be represented by the formula

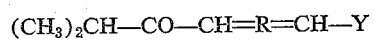

in which the group —CH=R=CH— is a hydrocarbon carotenoid connecting group selected from the group consisting of conjugated polyethylenic hydrocarbon connecting groups and acetylenic analogues thereof, and Y is a group selected from the group consisting of

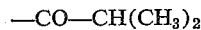

and

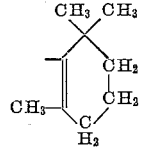

with ethyl vinyl ketone in the presence of an alkaline condensation agent, as hereinbefore defined, preferably selected from the group consisting of caustic alkalies, alkali metal alkoxides and aluminum alkoxides.

The process is preferably carried out by generating the ethyl vinyl ketone in situ during the condensation reaction by the action of an alkali metal hydroxide or alkoxide on a quaternary ammonium salt of the general formula

in which $(Z^+A^-)$ represents a quaternary ammonium residue, conveniently a diethyl-methylamino or trimethyl-amino-halide or -hydroxide group.

As the cyclisation stage of the reaction to yield the carotenoid compound will proceed readily in situ under action of the alkaline condensation agent it is preferred to carry out the process without separating the keto-alkylidene alkapolyene.

Examples of mono aldehydes which may be employed for the production of the polyunsaturated ketone instead of the dialdehydes already mentioned are 17-2',6',6',-trimethyl - cyclohexen-(1')-2,6,11,15 - tetramethylheptadecaoctaen-(2,4,6,8,10,12,14,16) - al - (1) [which may be termed apo-2-carotinal] or 17-[2',6',6'-trimethyl-cyclohexen-(1')-yl]-2,6,11,15 - tetramethyl - heptadecaheptaen-(2,4,6,10,12,14,16)-in-(8)-al-(1) [which may be termed dehydro-apo-2-carotinal].

Aldehydes having acetylenic linkages at positions where ethylenic linkages are required in the carotenoid compound, examples of which have been cited hereinbefore are preferred to the wholly ethylenic aldehydes as their reactions tend to take place with better yields. The acetylenic linkages may be partially saturated in the final carotenoid compound or at any desired stage in the production thereof, for example by catalytic hydrogenation using a hydrogenation catalyst which has been partially poisoned in order to prevent complete saturation taking place.

The following examples are given in order to illustrate the invention. All temperatures are given in degrees centigrade and all proportions mentioned are by weight.

Example 1

*1-diethylaminopentan - 3 - one.*—Reaction of propionyl chloride (300 g.) in chloroform (1 l.) with ethylene in the presence of aluminium chloride (454 g.) gave 1-chloropentan-3-one (160 g.), B.P. 40°/1 mm., $n_D^{23}$ 1.4360 (McMahon, Roper Utermohlen, Hasek, Harris and Brant, J.A.C.S., 1948, 70, 2971, give B.P. 33°/2.5 mm., $n_D^{20}$ 1.4361).

Treatment of the chloro-ketone (160 g.) in ether (400 cc.) with diethylamine (192 g.) in ether (500 cc.) yielded 1-diethylaminopentan-3-one (160 g.), B.P. 98–99°/50 mm., $n_D^{22}$ 1.4345 (Adamson, McQuillin, Robinson and Simonsen J.A.C.S., 1937, 1576, give B.P. 84°/13 mm., $n_D^{15}$ 1.4368). Reaction of the aminoketone with an equal amount of methyl iodide (Wilds and Shunk, J.A.C.S., 1943, 65, 469) afforded a methiodide as a hygroscopic solid which was used without purification.

*2:6:10:15:19:23 - hexamethyltetracosa - 4:6:8:10:12: 14:16:18:20 - nonaene - 3:22 - dione* for which R, as hereinbefore defined, has the structure

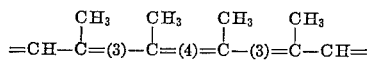

where the figures in brackets denote conjugated hydrocarbon chains containing the specified number of carbon atoms (thus (3) denotes the chain =CH—CH=CH—).

A mixture of crocetindial (1.0 g.), 3-methylbutan-2-one (60 cc.) and 5% ethanolic potassium hydroxide (80 cc.) was shaken occasionally and kept at 20° for 24 hours. The product (1.2 g.) which had crystallised from the reaction medium was collected and had M.P. 180–182°. Recrystallisation from benzene-light petroleum (B.P. 60–80°) gave the nonaenedione (1.0 g.) as purple plates, M.P. 184–186°.

*Canthaxanthin.*—A solution of the nonaenedione (86 mg.) in benzene (7 cc.) was added to a solution of potassium ethoxide (from 315 mg. of potassium) in ethanol (7 cc.) and the mixture was stirred at 20° for 1 hour. 2.5 grams of the 1-diethylaminopentan-3-one methiodide dissolved in alcohol (12 cc.) was added, and the mixture was boiled and diluted with ethanol (35 cc.). The resulting homogeneous solution was boiled under reflux for 6.5 hours. Potassium ethoxide (from 270 mg. of potassium) in ethanol (6 cc.) was added and boiling was continued for another hour. The reaction mixture, which no longer showed an ultraviolet light absorption maximum with wavelengths greater than 500 mμ, was cooled and poured into dilute hydrochloric acid. Extraction of the product with benzene, and chromatography from benzene-light petroleum (B.P. 60–80°) on alumina (grade IV Brockmann and Schodder, Ber., 1941, 74, 73) gave three red bands. Collection of the middle band, evaporation, and crystallisation of the residue from n-pentane-chloroform gave canthaxanthin (12 mg.), M.P. and mixed M.P. 211–212° (Petracek and Zechmeister, J.A.C.S., 1956, 1427, give M.P. 213–214°), (evacuated capillary tube) $\lambda_{max.}$ ($C_6H_6$), 480 mμ, $\epsilon=117,000$; $\nu_{max.}$ ($CHCl_3$), 1652 cm.$^{-1}$, $\epsilon=895$. A mixed chromatogram with an authentic specimen revealed no separation.

Example 2

*2:6:10:15:19 - pentamethyl - 21 - (2:6:6 - trimethylcyclohex - 1 - enyl)heneicosa - 4:6:8:10:12:14:16:18:20-nonaen-3-one* for which R, as hereinbefore defined, has the structure

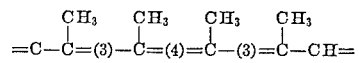

where the figures in brackets have the significance recited in Example 1.

A solution of β apo-2-carotenal (60 mg.) and 3-methylbutan-2-one (1 cc.) in 5% ethanolic potassium hydroxide (4 cc.) was kept at 20° for 12 hours. The product (59 mg.) which had crystallised from the reaction medium was collected and had M.P. 156–158°. Crystallisation from benzene-methanol gave the ketone, M.P. 158–159° (Kofler block), 159–161.5° (evacuated sealed capillary tube). (Found: C, 86.6; H, 9.85. $C_{35}H_{48}O$ requires C, 86.7; H, 10.6%), $\lambda_{max.}$ ($C_6H_6$) 480 mμ, $\epsilon=117,500$; $\nu_{max.}$ 1667, 1658, 1645 cm.$^{-1}$.

*Echinenone.*—A solution of the ketone (40 mg.) in benzene (5 cc.) was added to a solution of potassium ethoxide (from 250 mg. of potassium) in ethanol (5 cc.). 1-diethylaminopentan-3-one methiodide (2.0 g.) in alcohol (10 cc.) was added and the mixture ($\lambda_{max.}$ 480 mμ) was stirred and boiled under reflux for 2.5 hours. Potassium ethoxide (from 250 mg. of potassium) in ethanol (10 cc.) was added and the mixture boiled overnight. The reaction mixture ($\lambda_{max.}$ 470 mμ) was cooled and poured into dilute hydrochloric acid. Extraction of the product with light petroleum (B.P. 60–80°) chromatography from benzene-light petroleum (B.P. 60–80°) on alumina (grade IV), collection of the main band, evaporation, and crystallisation of the residue from n-pentane-chloroform, gave echinenone (11 mg.), M.P. and mixed M.P. 178–179° (evacuated capillary tube) (Petracek and Zechmeister, J.A.C.S., 1956, 78, 1427 give M.P. 175–178°), $\lambda_{max.}$ ($C_6H_6$), 472 mμ, $\epsilon=115,000$; $\nu_{max.}$ ($CHCl_3$) 1654 cm.$^{-1}$, $\epsilon=410$.

Example 3

*2:6:10:15:19:23 - hexamethyltetracosa - 4:6:8:10:14: 16:18:20-octaene-12-yne-3:22-dione* for which R, as hereinbefore defined, has the structure

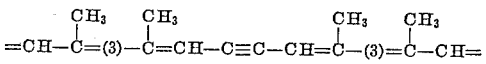

in which the figures in brackets have the significance recited in Example 1.

A mixture of 8:8'-dehydrocrocetin-dial (350 mg.), 3-methylbutan-2-one (6 cc.), and 5% ethanolic potassium hydroxide (8 cc.) was shaken occasionally and kept at 20° for 18 hours. The product (330 mg.) which had crystallised from the reaction medium was collected and had M.P. 192–195°. Recrystallisation from benzene-methanol gave the diketone (310 mg.) as deep orange plates, M.P. 193.5–195° (Kofler block). (Found: C, 83.2; H, 8.75. $C_{30}H_{38}O_2$ requires C, 83.65; H, 8.9%), $\lambda_{max.}$ ($C_6H_6$) 454 and 485 mμ, $\epsilon=98,000$ and 85,400 respectively, $\nu_{max.}$ 2155, 1672, 1656, 1645, cm.$^{-1}$.

*15:15'-dehydrocanthaxanthin.*—A solution of the diketone (43 mg.) in benzene (3 cc.) was added to a solution of potassium ethoxide (from 154 mg. of potassium), in ethanol (3 cc.). 1-diethylaminopentan-3-one methiodide (1.2 g.) in alcohol (6.0 cc.) was added and the mixture ($\lambda_{max.}$ 454 and 485 mμ) was stirred and boiled under reflux for 2.5 hours. Potassium ethoxide (from 100 mg. of potassium) in ethanol (6 cc.) was added and the mixture was boiled for another 18 hours. The reaction mixture ($\lambda_{max.}$ 440 mμ) was cooled and poured into dilute hydrochloric acid. Extraction of the product with benzene-light petroleum (B.P. 60–80°) on alumina (grade IV), collection of the main band, evaporation, and crystallisation of the residue, from benzene-light petroleum (B.P. 60–80°) gave light red needles (23 mg.), M.P. 187–190°. Recrystallisation from chloroform-light petroleum (B.P. 60–80°) gave dehydrocanthaxanthin, M.P. 192–193° (Kofler block). (Found: C, 85.7; H, 8.7. Calc. for $C_{40}H_{50}O_2$: C, 85.35; H, 8.95%), $\lambda_{max}$. ($C_6H_6$) 448 m$\mu$, $\epsilon$=80,000; $\nu_{max}$. 2155, 1653 cm.$^{-1}$. (Isler, Lindlar, Montavon, Rüegg and Zeller, Helv. Chim. Acta, 1956, 39, 449, give M.P. 185–186°, uncorr.; $\lambda_{max}$. (light petroleum) 438 m$\mu$, $\epsilon$=105,000.)

The conversion of 15:15'-dehydrocanthaxanthin into canthaxanthin has been reported by Isler, Montavon, Rüegg, Saucy and Zeller (Verh. Naturf. Ges. Basel, 67, 379) and by Isler, Guex, Lindlar, Montavon, Rüegg, Ryser, Saucy and Schwieter (Chimia, 1958, 12, 89).

Example 4

2:6:10:15:19 - pentamethyl - 21 - (2:6:6 - trimethylcyclohex - 1 - enyl)heneicosa - 4:6:8:10:14:16:18:20-octaen-12-yn-3-one for which R, as hereinbefore defined, has the structure

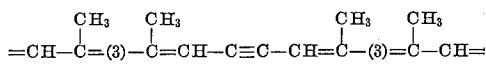

where the figures in brackets have the significance recited in Example 1.

A solution of 8:9-dehydro-$\beta$-apo-2-carotenal and 3-methylbutan-2-one (3 cc.) in 5% ethanolic potassium hydroxide (12 cc.) was kept at 20° for 14 hours. The product (315 mg.) which had crystallised from the reaction medium was collected and had M.P. 151–153°; crystallisation from benzene-methanol gave the dehydroketone as deep orange plates, M.P. 153–154.5° (Kofler block). (Found: C, 87.45, H, 9.6. $C_{35}H_{46}O$ requires C, 87.1; H, 9.6%), $\lambda_{max}$. ($C_6H_6$) 454 m$\mu$, $\epsilon$=99,000; $\nu_{max}$. 2151, 1672, 1650, 1639 cm.$^{-1}$.

*15:15'-dehydroechinenone.*—A solution of the preceding ketone (43 mg.) in benzene (3 cc.) was added to one of potassium ethoxide (from 150 mg. of potassium) in ethanol (3 cc.). 1-diethylaminopentan-3-one methiodide prepared as in Example 1 (1.2 g.) in ethanol (6 cc.) was added and the mixture ($\lambda_{max}$. 454 m$\mu$) was stirred and boiled under reflux for 1.5 hours. Potassium ethoxide (from 100 mg. of potassium) in ethanol (5 cc.) was added, and the mixture was boiled for 18 hours. The reaction mixture ($\lambda_{max}$. 442–445 m$\mu$) was cooled and poured into dilute hydrochloric acid. Extraction of the product with benzene-light petroleum (B.P. 60–80°), chromatography from benzene-light petroleum (B.P. 60–80°) on alumina grade IV, collection of the main band, evaporation and crystallisation from light petroleum (B.P. 40–60°) gave a solid (27.5 mg.), M.P. 164–166°. Recrystallisation from the same solvent yielded dehydroechinenone, as deep orange plates, M.P. 168–171° (Kofler block). (Found: C, 87.65; H, 9.4. $C_{40}H_{52}O$ requires C, 87.55; H, 9.55%), $\lambda_{max}$. ($C_6H_6$) 445 m$\mu$, $\epsilon$=90,000; $\nu_{max}$. 2151, 1653 cm.$^{-1}$.

Example 5

A solution of a portion of the dehydro ketone produced in the preceding example (50 mg.) in benzene (3 ml.) and ethanol (8 ml.) was added to a solution of potassium ethoxide (from 135 mg. of potassium) in ethanol (2.5 ml.) and the reaction solution refluxed with stirring. Ethyl vinyl ketone (1 ml.) in alcohol (5 ml.) was then added to the reaction mixture, a small quantity at a time over a period of 7 hours. Potassium ethoxide (from 25 mg. of potassium) in ethanol (5.5 ml.) and benzene (1 ml.) was added and the mixture boiled for 19 hours. The reaction mixture ($\lambda_{max}$. 445 m$\mu$) was cooled, and poured into dilute hydrochloric acid. Extraction of the product with benzene-light petroleum (B.P. 60–80°), chromatography from benzene-light petroleum (B.P. 60–80°) on alumina (grade IV), collection of the main band, evaporation, and crystallisation from light petroleum (B.P. 40–60°) gave a crystalline solid (25 mg.) M.P. 168–171°. Recrystallisation from the same solvent yielded dehydroechinenone as deep orange plates M.P. 170 to 172°. Underpressed on admixture wtih the product obtained in the preceding example.

Example 6

To a solution of (18 g.) of the same dehydro ketone in benzene (300 cc.) and ethanol (100 cc.), was added a solution of choline in ethanol (0.3 cc., 50%), followed by ethyl vinyl ketone (7 g.). The mixture was stirred for 1 hour at room temperature, then for 2 hours at 35° and finally boiled for 10 minutes. A solution of potassium hydroxide (15 g.) in ethanol (100 cc.) was added during 10 minutes to the hot mixture which was then stirred under reflux for 1 hour. After the mixture had been cooled, it was poured into water. The organic layer was separated and washed with water until neutral. The solution was dried and evaporated (to 50 cc.). Methanol (50 cc.) was added and the solution was left overnight at 0° to crystallise. Filtration gave dehydroechinenone (10.7 g.) which without further purification had M.P. 162–164°.

Example 7

A solution of dehydroechinenone produced as previously described (27.5 mg.) in ethyl acetate (5 ml.) containing a trace of quinoline, was shaken wtih Lindlar's catalyst (Lindlar, Helv. Chim. Acta, 1952, 35, 446) (25 mg.) in an atmosphere of hydrogen until 1.1 mol. of hydrogen had been absorbed. Removal of catalyst and solvent gave a solid which was dissolved in benzene (15 ml.). Iodine (0.4 mg.) in benzene (2 ml.) was added and the solution was irradiated (100 watt tungsten lamp) at room temperature for 48 hours. Chromatography of the solution on alumina (grade IV) gave echinenone (5 mg.) which without further purification had M.P. 170–173°.

We claim:

1. A process for the preparation of a carotenoid compound in which the carotenoid connecting group is a hydrocarbon radical selected from the group consisting of conjugated polyethylenic hydrocarbon carotenoid connecting groups and acetylenic analogues thereof which comprises condensing a polyunsaturated ketone represented by the formula $(CH_3)_2CH$—CO—CH=R=CH—Y in which the group CH=R=CH— is a hydrocarbon carotenoid connecting group selected from the group consisting of conjugated polyethylenic hydrocarbon carotenoid connecting groups and acetylenic analogues thereof, and Y is a group selected from the group consisting of

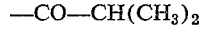

and

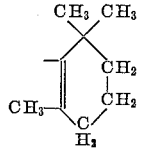

with ethyl vinyl ketone in the presence of an alkaline condensation agent selected from the group consisting of caustic alkalies, alkali metal alkoxides and aluminum alkoxides.

2. A process as in claim 1 in which the ethyl vinyl ketone is generated in situ during the condensation reaction by the action of an alkaline agent selected from the group consisting of alkali metal hydroxides and alkali metal alkoxides on a quaternary ammonium salt of the formula

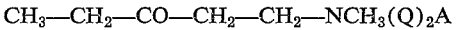

in which Q represents an alkyl hydrocarbon group containing 1 to 2 carbon atoms and A represents an ion selected from the group consisting of halide and hydroxy ions.

3. A process as in claim 1 in which the ethyl vinyl ketone is generated in situ during the condensation reaction by the action of an alkaline agent selected from the group consisting of alkali metal hydroxides and alkali metal alkoxides on the quaternary ammonium salt 1-diethyl-aminopentan-3-one methiodide.

4. A process for the preparation of the carotenoid compound canthaxanthin which comprises condensing 2:6:10:15:19:23 - hexamethyltetracosa - 4:6:8:10:12:14:16:18:20-nonaene-3:22-dione with ethyl vinyl ketone in the presence of an alkaline condensation agent selected from the group consisting of caustic alkalies, alkali metal alkoxides and aluminum alkoxides.

5. A process for the preparation of the carotenoid compound echinenone which comprises condensing 2:6:10:15:19 - pentamethyl - 21 - (2:6:6 - trimethylcyclohex - 1 - enyl) - heneicosa - 4:6:8:10:12:14:16:18:20-nonaene-3-one with ethyl vinyl ketone in the presence of an alkaline condensation agent selected from the group consisting of caustic alkalies, alkali metal alkoxides and aluminum alkoxides.

6. A process for the preparation of the carotenoid compound dehydrocanthaxanthin which comprises condensing 2:6:10:15:19:23-hexamethyltetracosa-4:6:8:10:14:16:18:20-octaene-12-yne-3:22-dione with ethyl vinyl ketone in the presence of an alkaline condensation agent selected from the group consisting of caustic alkalies, alkali metal alkoxides and aluminum alkoxides.

7. A process for the preparation of the carotenoid compound dehydroechinenone which comprises condensing 2:6:10:15:19-pentamethyl-21-(2:6:6-trimethylcyclohex-1-enyl)-heneicosa - 4:6:8:10:14:16:18:20 - octaene-12-yne-3-one with ethyl vinyl ketone in the presence of an alkaline condensation agent selected from the group consisting of caustic alkalies, alkali metal alkoxides and aluminum alkoxides.

References Cited in the file of this patent

UNITED STATES PATENTS

| | | |
|---|---|---|
| 2,617,828 | Sarett et al. | Nov. 11, 1952 |
| 2,671,808 | Johnston et al. | Mar. 9, 1954 |

OTHER REFERENCES

Adams et al.: Organic Reactions, vol. 1, pp. 320–2 (1942).

Ahmad et al.: J. Chem. Soc. (London) 1953, pp. 3286–94, 3815–17.

Warren et al.: J. Chem. Soc. (London), pp. 3972–86, November 1958 (pp. 3972–4 and 3982 relied on).